HAROLD M. LANG
INVENTOR.

BY John D. Gassett
ATTORNEY.

April 30, 1968 H. M. LANG 3,380,551
GAS IGNITING SEISMIC SOURCE FOR WELL BORES
Filed Dec. 22, 1965 3 Sheets-Sheet 2

HAROLD M. LANG
INVENTOR.

BY *John D. Gassett*
ATTORNEY.

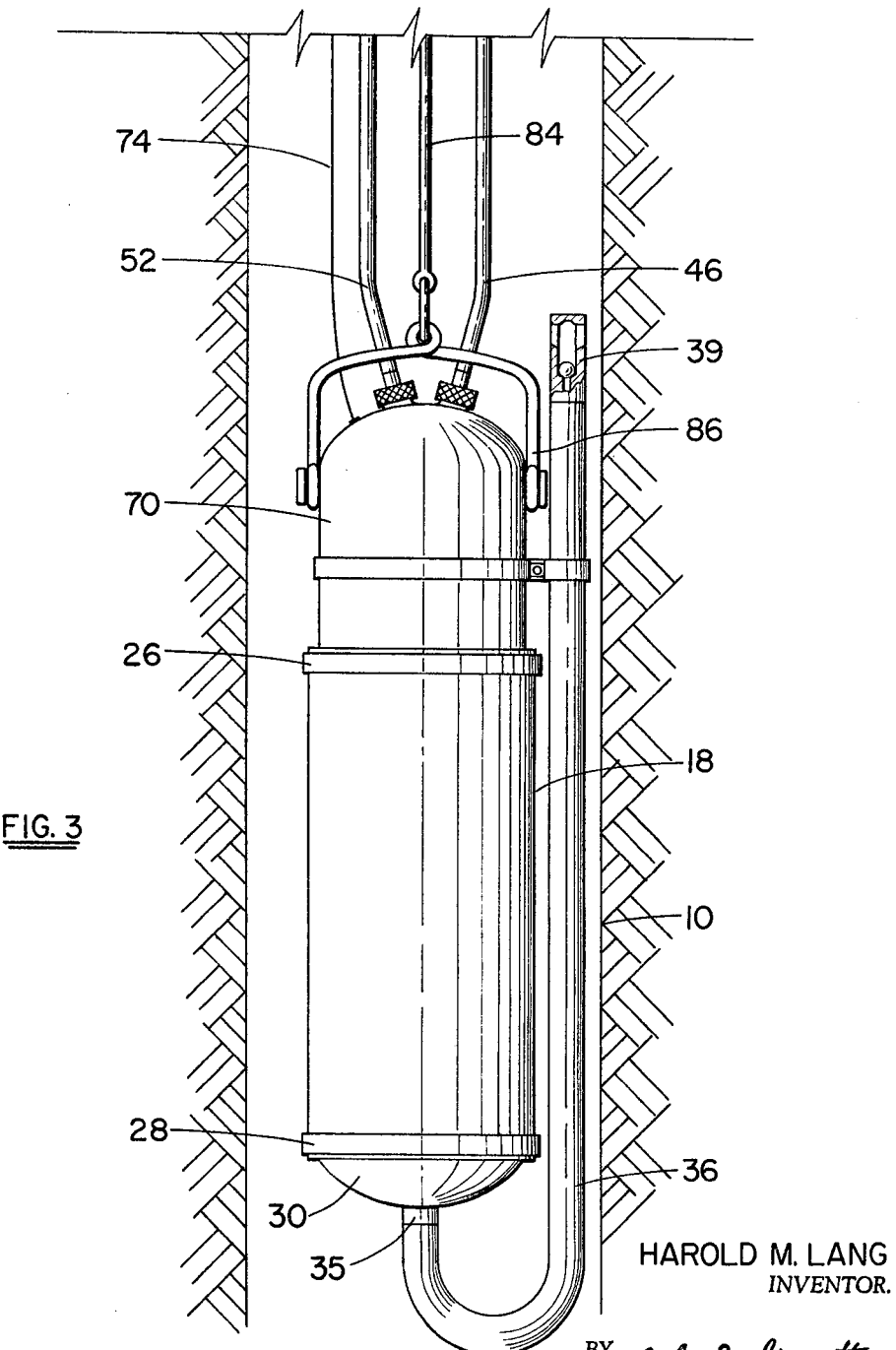

United States Patent Office 3,380,551
Patented Apr. 30, 1968

3,380,551
GAS IGNITING SEISMIC SOURCE
FOR WELL BORES
Harold M. Lang, Tulsa, Okla., assignor to Pan American
Petroleum Corporation, Tulsa, Okla., a corporation of
Delaware
Filed Dec. 22, 1965, Ser. No. 515,653
16 Claims. (Cl. 181—.5)

ABSTRACT OF THE DISCLOSURE

A gas fired seismic generator for use in a body of fluid such as in a well bore. A perforated, elongated, rigid, tubular member has perforations which are completely surrounded by an elastic sleeve sealed at each end to the tubular member. An explosive gas mixing chamber is provided at the upper end of the tubular member. An exhaust conduit is connected to the lower end of the tubular member and extends to above the apparatus. A special gas mixing chamber having a flame arrester and a separate ignition chamber is provided and is preferred. The annular mixing chamber has a spark plug located opposite an opening so as to form a Mach stem upon collision of the two wave fronts which is essentially twice the pressure and temperature of either of the two colliding waves. This results in a jet projecting downwardly through the opening into the main combustion chamber.

---

This invention relates to seismic geophysical surveying and is directed particularly to a novel way of generating seismic waves. More particularly it is directed toward a seismic generator for the initiation of seismic disturbances in shot holes using elongated charges of explosive gas mixtures.

In geophysical seismic prospecting a seismic disturbance is initiated at or near the earth's surface and travels downwardly into the earth until it encounters interfaces between different type subsurface materials. A portion of the energy is reflected back toward the surface from these interfaces. The reflected energy is detected at the surface by geophones, the motion of the earth being related to the depth and character of subsurface beds. The signal from the geophones is recorded. One of the most common methods of initiating the seismic disturbance is by the detonation of explosive charges such as dynamite in relatively shallow holes drilled in the earth which are commonly referred to as shot holes. These shot holes are normally drilled from about 50 to about 300 feet and it is usually preferred that they be drilled through the surface layer which is commonly called the weathered layer and normally has a velocity of seismic wave transmissions which is much lower than that of the formations beneath the weathered layer. This weathered layer is usually not over a few hundred feet in thickness. The seismic-wave transmission velocities below the weathered layer most frequently lie in the range from 5000 to 10,000 feet per second.

The use of concentrated explosive charges in a shot hole frequently gives rise to undesirable interfering waves. Some of these waves can be eliminated by particular arrangements of the explosive material itself. It has been found, for example, that certain types of interfering waves can be suppressed or partially eliminated by distributing the explosive charge material throughout a considerable length of the shot hole and detonating it from the top downwardly. The charge material is selected and arranged so the velocity of the detonation along the length of the charge approximately matches the seismic wave transmission velocity of the formations surrounding the shot hole. One method of preparing such charges is disclosed in Silverman Patent No. 2,609,885. Although this method has been of great help in eliminating some of the undesirable waves and their resulting spurious seismic data, it still has certain shortcomings. One such shortcoming is that it is most difficult to repeat the exact seismic initiation in a particular shot hole which is frequently desirable as in so-called "stacking" techniques of processing seismic data. One cause is that after a charge has been exploded the shot hole is no longer the same. A subsequent charge which may be identical to the first one, then gives a seismic initiation which is considerably different from the prior charge. Additionally, detonation of such a charge may cause the walls of the shot hole to cave. This caving also may make it difficult or impossible to load subsequent charges into the shot hole to the same depth as prior shots.

In my U.S. Patent No. 2,846,019, I disclosed a method whereby seismic waves are effectively and inexpensively generated in a borehole by filling a portion of the borehole with any one of a number of explosive gaseous mixtures and then igniting the gaseous column in such a way that detonation occurs. In this case the composition of the gaseous mixture chiefly determines the velocity with which detonation proceeds along the borehole. By using the method in that patent one can adjust the detonation velocity to any desired value within a substantial range so that the detonation velocity matches the seismic wave transmission velocity of the surrounding formations. That patent also describes means for determining the time break, i.e., when detonation has taken place. This method of placing the gas mixture in direct contact with the borehole wall, though it has worked quite satisfactorily, has certain limitations. For one thing, in some formations which are not very stable and can be referred to as "cavey," the detonation of the gas causes part of the borehole wall to cave in. This changes the characteristics of the borehole and makes it more difficult to obtain successive seismic initiation having the same characteristics.

Accordingly it is an object of this invention to provide an improved system for utilizing a mixture of gases as the seismic source. It is an especial object to provide means whereby the walls of the borehole are not so easily damaged and further to provide a method whereby the borehole itself does not need to be empty of water and drilling mud.

In the older system discussed above where the gas was placed directly in contact with the borehole wall, one does not have very great control of the amount of water vapor in the gas mixture. The velocity of detonation of a gaseous explosive is sensitive to the percentage of water vapor in the gaseous mixture. In my present invention, water vapor may be completely excluded from the gaseous explosive, if desired.

Briefly, the preferred embodiment of my invention comprises a seismic generator which can be lowered into a shot hole and includes a perforated, elongated, more or less rigid tubular member whose perforations are completely surrounded by an elastic sleeve or boot sealed at each end to the tubular member. An explosive gas mixing chamber is provided at the upper end of the tubular member. An exhaust conduit is connected to the lower end of the tubular member and extends at least to above the apparatus and preferably to the surface. Preferably a fuel line and an oxygen line extend to surface sources of such fuel and such oxygen. In operation, the device is lowered into a borehole filled with drilling mud or water and the oxygen and fuel are injected into the mixing chamber so they are thoroughly mixed into a suitable explosive mixture. This explosive mixture passes rapidly through the mixing compartment into the interior of the perforated tubular member. When the apparatus is lowered to its desired location in the shot hole, the mixture is ignited at the top of the elongated tube and a detonation wave travels rapidly downwardly at the velocity applicable to the gas mixture selected. The seismic wave from this detonation is transferred through the perforated tubular member and elastic boot to the well fluid and surrounding formation. As the detonation is contained within the perforated member and surrounding boot there is a minimum of damage to the shot hole wall. The particular elastic boot is selected in conjunction with the size of the perforations of the tube so that the boot does not expand greatly, nor is it forced inwardly through the perforations of the interior member by pressure of the surrounding liquid in the shot hole. With this system I can rapidly and effectively reproduce a particular seismic disturbance as many times as desired.

Other objects and a better understanding of the invention can be had from the following description taken in conjunction with the drawings in which:

FIGURE 3 is a modification of the apparatus of FIGURE 1; and,

Figure 1:
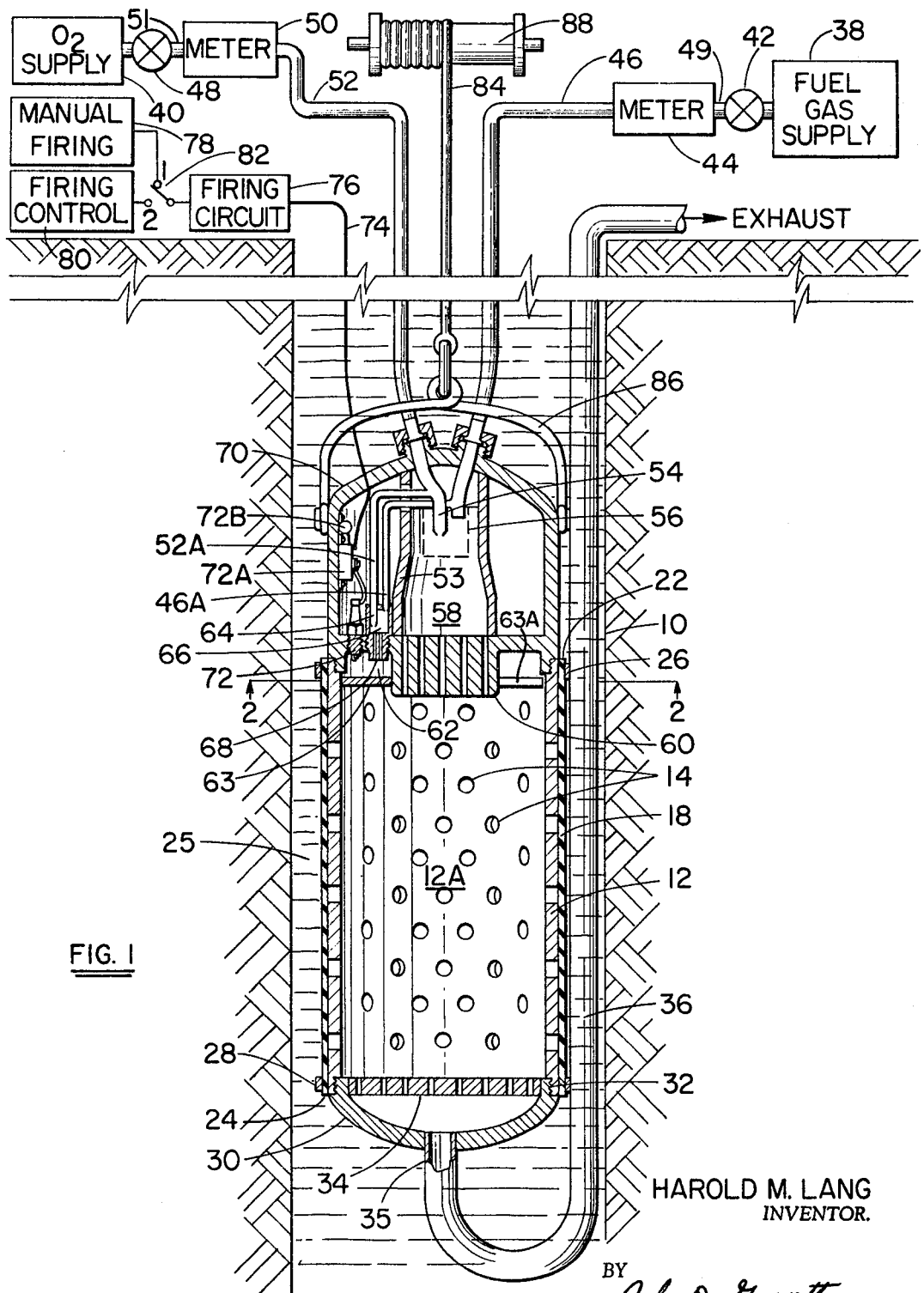
FIGURE 1 shows an apparatus diagrammatically and partly in cross-section embodying the invention and positioned in a borehole.

Referring now to the drawings and to FIGURE 1 in particular, there is illustrated an embodiment of this invention. Shown positioned in borehole 10 is an elongated tubular member or pipe 12 having a plurality of perforations 14 spaced substantially along its entire length. As will be seen, tubular member 12 serves as the main detonation or explosion chamber. Typical sizes of perforations 14 are from about ½" in diameter to about 1". Typically, the total area of the perforations should occupy between about 10% and 40% of the circumferential area of the tubular member. Although tubular member 12 as shown comprises one continuous section, it can be made of a plurality of sections connected together. Elongated member 12 is a rigid member and is preferably made of a high quality steel which can withstand relatively high temperatures.

Mounted about elongated member 12 is a resilient sleeve 18 preferably made from a high temperature elastomer. Sleeve 18 is sealed at its upper end 22 about the exterior of tubular member 12 above the uppermost perforation and at its lower end 24 below the lowermost perforation. Ends 22 and 24 of the sleeve can be molded to tubular member 12 or held in place by bands 26 and 28, or by both such molding and bands. Sleeve 18 is made of an elastomeric material with a medium to high durometer (ASTM D 676–58T) value, e.g., about 40 to 80, and is of a material which can withstand high temperature for short durations. A suitable material includes a Silastic compound. The material of sleeve 18 should be sufficiently resilient to readily transmit the pressure wave from the detonation of the gas in elongated member 12 to liquid in the borehole surrounding the apparatus.

The lower end of tubular member 12 is enclosed by a cap 30 which is threadedly connected thereto by threads 32. A gas exhaust port means 35 is provided in cap 30. A flame arrester 34 is positioned in the lower end of tubular member 12. An exhaust conduit 36 is connected to exhaust port means 35 and extends to the surface. This functions to carry the exhaust gas above the liquid in the borehole. This is desirable because if the exhaust gas entered the liquid, the gas would form bubbles in the well fluid between the seismic generator and the borehole wall and thus greatly reduce the fluid coupling with a resulting decrease in the transmittal of energy to the earth.

Attention will now be directed toward means for supplying an explosive gas mixture to the interior of tubular member 12. At the surface there is provided a fuel gas supply 38 and an oxygen supply 40. One can normally use air instead of 100% oxygen unless the volume of air required becomes more than the pumping capacity. A conduit 49 having valve 42 is connected to a meter 44 for measuring the volume or mass of fuel gas. The outlet of meter 44 is connected to a flexible conduit 46 which extends downwardly into the well bore to the seismic generator. Likewise oxygen supply 40 is connected through a conduit 51 having valve 48 to meter 50 for metering the volume or mass of the oxygen. The output of meter 50 is connected through flexible conduit 52 and extends downwardly into the borehole to the seismic generator.

Consideration will now be given to the mixing chamber means into which the oxygen and fuel are connected. This includes a bell-like member 53 in the upper end of the seismic generator. The interior of bell-like member 53 is identified as main mixing chamber 58. Member 53 is supported by outer shell 70 which is threadedly connected to tubular member 12 and forms a top part thereof. In the upper end of bell member 53 is a perforated cylinder 56 which surrounds a jet 54. Oxygen supply line 52 is connected into jet 54 and fuel supply conduit 46 is connected into the perforated cylinder 56 surrounding the jet. By the time that the fuel and oxygen have escaped perforated cylinder 56 into mixing chamber 58 they are thoroughly mixed. A flame arrester 60 is provided in the lower end of bell 53. Flame arrester 60, as shown, is a metallic block with longitudinal holes drilled therethrough to provide fluid communication between the chamber 58 inside bell 53 and the interior of tubular member 12 which is identified as explosive chamber 12A. The purpose of the flame arrester is of course to prevent any ignition within the mixing chamber 58.

Figure 2:
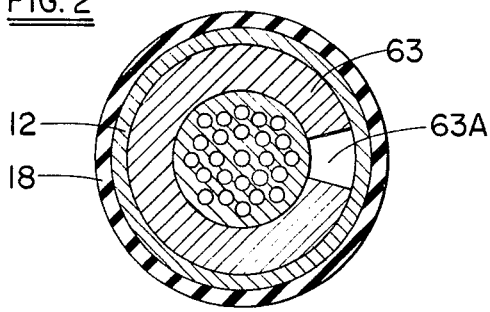
FIGURE 2 is a section view taken along the line 2—2 of FIGURE 1.

Means for igniting the explosive mixture in elongated member 12 will now be discussed. This includes an annular space 62 which surrounds flame arrester 60. A plate 63 closes the lower end of such annular space except for opening 63A shown in FIGURE 2 which extends for about 30 to 40°. Means are provided for supplying an explosive mixture to within this annular space. This includes an initiation mixing chamber 66 within annular cap 70. Within chamber 66 is jet 64. Mixing chamber 66 and associated jet 64 are diametrically opposite the opening 63A in plate 63. Oxygen supply line 52 is connected by auxiliary conduit 52A to the interior of jet 64. Similarly, fuel supply line 46 is connected through lateral conduit 46A to the chamber 66 exterior of jet 64. A flame arrester 68 is provided in the lower end of chamber 66. This flame arrester has perforations therethrough which fluidly connect chamber 66 with annular chamber 62.

Means are provided for igniting the gas mixture in annular space 62. This includes a spark plug 72 with ignition coil 72A and capacitor 72B which are connected to the surface by suitable conductor 74 which is connected to firing circuit 76. In a preferred embodiment spark plug 72 is substantially diametrically opposite opening 63A of plate 63. In other words spark plug 72 is adjacent mixing chamber 66 and jet 64. Firing circuit 76 can be any well known means for providing a proper current pulse to coil 72A. The firing circuit 76 can be actuated by manual firing control 78 when switch 82 is in the Number 1 position. Sometimes it may be desirable to fire the circuit in a coded sequence. This can be done by putting switch 82 in its Number 2 position so that firing circuit 76 is connected to programmed firing control means 80. This programmed firing control means 80 can be any well known means for providing pulses spaced in time according to a selected code; such for example as a magnetic tape upon which the code has been recorded.

The firing circuit 76 has the function of firing the explosive charge in the seismic generator upon receiving an electrical command. This can come from instruments within a seismic recording truck as for instance the programmed firing control 80. In the single shot mode of operation, the signal supplied by the firing circuit need be only a single pulse sent downward through cable 74 which in cooperation with spark coil 72A produces an electric discharge at the electrodes of spark plug 72. In rapid or pattern firing mode, instead of a single pulse, a train of pulses spaced in accordance with a preselected code is supplied to the coil and spark plug 72 to fire the apparatus a number of times in rapid sequence.

We shall next consider a modification of the means of exhausting the products of combustion from elongated member 12. This includes a port means 35 connected to an exhaust conduit 36 which extends to the surface where the gas is exhausted. If desired, exhaust conduit 36 can terminate at a point slightly above the cap 70 of the seismic generator. This modification is shown in FIGURE 3. When such modification is used, it is normally desired to provide the outlet with a check valve 39 so that when there is no exhaust the upper outlet will not be filled with well bore fluid. The entire seismic generator is conveniently raised and lowered through the well bore by a line 84 which connects at its lower end to bail 86 which is connected to the cap 70 of the seismic generator. The upper end of line 84 is connected at the surface to a winch drum 88.

In one mode of operation, the device of FIGURE 1 is lowered into the well bore to a selected depth which is normally below the weathered or low velocity layer. Valves 42 and 48 are then open. By observations of the flowmeters 44 and 50, these valves are adjusted to introduce the proper ratio of fuel and oxygen to obtain a gas mixture having a desired detonation velocity. For a discussion of a selection of gases and oxygen for obtaining different detonation velocity attention is directed to my U.S. Patent 2,846,019.

In one mode of operation, after the desired amount of fuel gas and oxygen has been introduced into elongated member 12 through the main mixing chamber 58, valves 40 and 48 are closed. Assuming that the elongated chamber 12 is in its proper position, the device is now ready to be detonated. This is accomplished by firing circuit 76 which fires spark plug 72 within annular ignition chamber 62. By having a separate ignition chamber one can control the richness of the mixture to improve rapid initiation of detonation. By the particular apparatus of FIGURE 1 and also FIGURE 4, the ignition of the gas mixture proceeds away from spark plug 72 in both a clockwise and counter-clockwise direction around the annulus 62 and meet diametrically opposite from the spark plug. The interaction of the two wave fronts upon meeting produces a Mach stem of essentially twice the pressure and temperature of either of the two colliding waves. This results in a jet projecting downwardly through the opening 63A of the annulus to initiate directly the detonation wave in the main combustion chamber 12A. As the pressure wave associated with the detonation in the main volume of gas sweeps downward, gas from the high pressure explosive zone moves through perforations 14 in the wall of the detonation chamber and bears against the surrounding elastic sleeve and through the fluid within the well bore to the surrounding formation.

As I stated above, the wave of detonation can travel at different velocities, depending primarily upon the particular gas mixture used. For example, a propane and oxygen mixture of $C_3H_8+3O_2$ gives a velocity of about 8500 ft. per second, whereas $C_3H_8+6O_2$ gives a velocity of detonation of about 7500 feet per second. The detonation wave in the contained gas mixture is transmitted through perforations 14 to the rubber sleeve 18 and through the well fluid 25 to the surrounding formation. It is thus seen that this operation can be conducted in a well bore filled with drilling mud or water and that the device can be positioned vertically anywhere desired. As the actual detonation itself is contained within the chamber 12A there is very little damage to the well bore wall. Thus the shot can be repeated as often as desired with assurance that the characteristics will be substantially the same for each repeated detonation.

As I discussed briefly above, following each detonation of the gas mixture within chamber 12A, the spent gases are purged from within the chamber in preparation for the following shot by introducing the gases for the next charge at the head fixture, i.e., through mixing chamber 58, with sufficient pressure and volume to force the exhaust gases down and out through the exhaust port means 35 at the foot of the main combustion chamber. The exhaust then finds its way to the atmosphere through exhaust conduit 36. When a volume of new gas mixture has been introduced which is sufficient to have essentially purged the chamber, such volume of the next gas mixture is ready to be detonated. It is to be understood that by proper modification of the oxygen-fuel mixing means, a liquid fuel such as liquid propane may be used.

Figure 4:
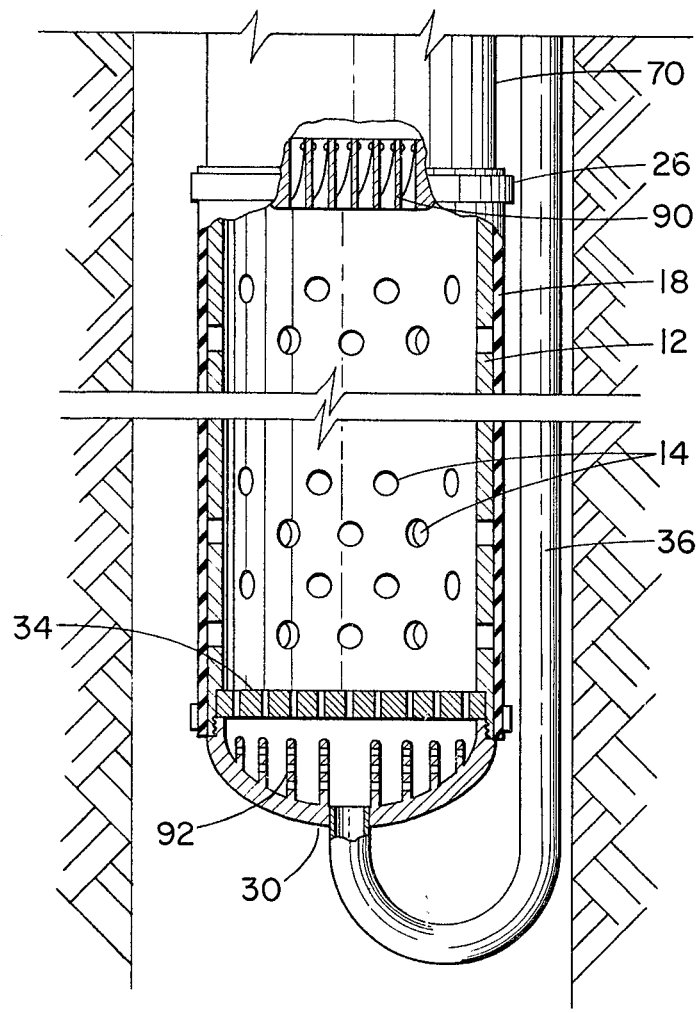
FIGURE 4 illustrates another modification of the apparatus of FIGURE 1.

The apparatus of FIGURE 4 is rather similar to that of FIGURE 1 with two main modifications, (1) the flame arrester 60 of FIGURE 1 has been replaced by a multiple reed inlet valve 90, (2) exhaust gas cooling fins 92 have been placed in the lower end of the apparatus beneath flame arresters 34. The rest of the apparatus is quite similar to FIGURE 1 and has retained the same reference numerals for ease of identification.

In the operation of the tool of FIGURE 4, oxygen is injected through line 52 and fuel gas through line 46. These two lines are made as large as conveniently possible so that large volumes of gases can be quickly injected to purge the chamber 12A very rapidly. In this device the functions of expelling exhaust gas and recharging the chamber after detonation depends upon the in-flow of fuel and oxygen at sufficient velocity to perform these functions in the required time. Thus the operation of this device is different from that of a ram jet aircraft engine which relies upon the forward motion of the vehicle to purge exhaust gas and refill the combustion chamber.

The seismic generator of FIGURE 4 is not a resonant system in the sense of a ram jet engine, as this seismic generator has a flame arrester 34 positioned at the lower end of chamber 12A which serves both to quench the flame and to absorb the shock wave energy. Thus there is essentially no wave reflected back up chamber 12A.

In operation, the main flow of fuel and oxygen is downwardly through lines 52 and 46 into mixing chamber 58. The mixed gases then flow out multiple reed inlet valve 90 into the chamber 12A. As described above in connection with FIGURE 1, an auxiliary flow of gas and oxygen goes through an auxiliary mixing means to fill the annular ignition chamber 62. This chamber contains the electrode end of spark plug 72 where detonation of the gas is initiated either by manual firing or by the programmed firing means 80 as described above.

In a preferred operation, the seismic generator is fired in rapid sequence for a selected interval of time. In such operation the oxygen and gas are continuously injected into the system at a constant rate. In this way, as detonation moves downward, purging and refilling of the detonation chamber 12A for the next detonation begins.

Immediately behind the traveling explosion is a zone of sharply reduced pressure. When the system is used for rapid fire, this permits the gas from chamber 58 to be rapidly fed into the main combustion chamber 12A. The maximum firing rate may be increased to the maximum frequency at which it is possible to flow gas through the chamber 12A to sweep out the exhaust gas and recharge the system. Thus the maximum rate of igniting the system is a function of the length of the combustion chamber, size of the fuel and oxygen lines and their supply pressure. Frequency patterns within this range may be produced by firing the spark plug and ignition system in the selected coded pulse pattern which as I have said above may be programmed on magnetic tape 80.

For rapid fire, it is preferred to use the embodiment of FIGURE 4 as the reed valves prevent any backflow from the main combustion chamber 12A to mixing chamber 58. Also cooling fins 92 reduce the temperature of the exhaust gas which for a given pressure reduces the volume of exhaust gas which must flow out the exhaust port 35 and conduit 36.

While the above embodiments of my invention have been described with a certain amount of detail, various modifications can be made therein without departing from the scope of my invention.

I claim:
1. An apparatus adapted to be moved through a borehole having water therein for generating a seismic signal which comprises:
   (a) an elongated tubular member having port means in the wall thereof;
   (b) an elastic sleeve the interor of which, in its retracted position, closely surrounds said elongated tubular member and covers said port means, the ends of said sleeve being in a sealing relationship with said tubular member;
   (c) means closing the lower end of said tubular member and including an exhaust port means therein for use in purging the interior of said elongated tubular member;
   (d) means for admitting a gas mixture into said elongated tubular member;
   (e) means for igniting the gas mixture; and
   (f) unobstructed exhaust conduit means connected to said exhaust port means and extending to above said water for continuously exhausting gas from said elongated tubular member, said conduit means also remaining unobstructed when said sleeve is in either a retracted or an expanded position whereby said elongated tubular member is continuously purged of gas.

2. An apparatus as defined in claim 1 in which said port means of said tubular member includes a plurality of perforations spaced along substantially the entire length thereof and in which the total area of the perforations occupy between about 10% and about 40% of the circumferential area of said tubular member covered by said elastic sleeve.

3. An apparatus as defined in claim 1 in which said elastic sleeve has a durometer value of at least about 40.

4. An apparatus as defined in claim 1 including a flame arrester provided in the lower end of said elongated tubular member.

5. An apparatus as defined in claim 1 including a mixing chamber, and first means for injecting fuel gas and second means for injecting oxygen into said mixing chamber.

6. An apparatus as defined in claim 1 including an exhaust conduit connected to the exhaust port means and extending from said exhaust port means longitudinally to said tubular member to at least above said elastic sleeve.

7. An apparatus as defined in claim 1 in which said means for igniting the gas mixture includes means for generating a spark and a programmed means for generating sparks in a selected time-spaced sequence.

8. An apparatus as defined in claim 5 in which said mixing chamber includes:
   a bell-shaped compartment connected to the upper end of said elongated tubular member;
   a chamber having perforated walls and mounted in the upper end of said bell-shaped compartment;
   jet means supported within said chamber;
   means to connect said oxygen supply into said jet means;
   means to connect fuel gas into said chamber exterior of said jet means;
   a flame arrester connected to the lower end of said bell and providing fluid communication between the interior of said bell and the interior of said elongated tubular member.

9. An apparatus as defined in claim 8 in which said ignition means includes:
   an annular chamber surrounding said flame arrester and opening into said elongated tubular member;
   an initiation mixing compartment above said annular chamber for mixing fuel and oxygen and including a flame arrester fluidly connecting said initiation mixing compartment and said annular chamber;
   a spark plug adjacent the flame arrester extending into said annular chamber;
   a plate closing the lower portion of said annular chamber, said plate having an opening diametrically opposite said spark plug.

10. An apparatus as defined in claim 1 in which said means for admitting a gas mixture into said elongated tubular member includes a multiple reed type valve.

11. An apparatus as defined in claim 4 including cooling fins positioned between said exhaust flame arrester and said exhaust port means.

12. An apparatus for exploding a gaseous mixture which comprises:
   an elongated tubular member;
   means for admitting a gas mixture into said elongated tubular member;
   an enclosed annular chamber positioned at the upper end of said elongated tubular member and having an opening only from one portion of said annular chamber into said tubular member;
   means for injecting an initiation mixture into said annular chamber;
   detonating means for detonating the initiation fuel; said detonating means being located diametrically opposite the opening of said annular chamber.

13. An apparatus adapted to be moved through a body of water for generating a seismic signal which comprises:
   an enclosed hollow member having port means in the wall thereof;
   an elastic member surrounding said hollow member and covering said port means;
   an exhaust port means in the wall of said hollow member;
   means for admitting a gas mixture into said hollow member;
   means for igniting the gas mixture; and
   unobstructed exhaust conduit means connected to said exhaust port means and extending to above said water for continuously exhausting gas from said enclosed hollow member, said conduit means also remaining unobstructed when said sleeve is in either a retracted or an expanded position whereby said enclosed hollow member is continuously purged of gas.

14. An apparatus as defined in claim 13 including a flame arrester provided within said hollow member and adjacent said exhaust port means.

15. An apparatus adapted to be moved through a body of water for generating a seismic signal which comprises:
   an enclosed hollow member having a port means in the wall thereof;
   an elastic member surrounding said hollow member and covering said port means;
   an exhaust port means in the wall of said hollow member;
   means for admitting a gas mixture into said hollow member, which includes a mixing chamber; first means for injecting fuel gas and second means for injecting oxygen into said mixing chamber, said mixing chamber including:
      a bell-shaped compartment connected to one portion of said hollow member;
      a chamber having perforated walls and mounted in the upper end of said bell-shaped compartment;
      jet means supported within said chamber;

means to connect said oxygen supply into said jet means;

means to connect fuel gas into said chamber exterior of said jet means;

a flame arrester connected to the lower end of said bell and providing fluid communication between the interior of said bell and the interior of said hollow member;

ignition means for igniting the gas mixture in said mixing chamber; and conduit means connected to said port means and extending to above said body of water.

16. An apparatus as defined in claim 15 in which said ignition means includes:

an annular chamber surrounding said flame arrester and opening into said hollow member;

an initiation mixing compartment above said annular chamber for mixing fuel and oxygen and including a flame arrester fluidly connecting said initiation mixing compartment and said annular space;

a spark plug adjacent the flame arrester extending into said annular chamber;

a plate closing the lower portion of said annular chamber, said plate having an opening diametrically opposite said spark plug.

References Cited

UNITED STATES PATENTS

| | | | |
|---|---|---|---|
| 2,696,258 | 12/1954 | Greene | 166—63 |
| 2,846,019 | 8/1958 | Lang | 181—.5 |
| 2,994,397 | 8/1961 | Huckabay | 181—.5 |
| 3,064,753 | 11/1962 | McClure | 181—.5 |
| 3,176,787 | 4/1965 | Roever | 181—.5 |
| 3,249,177 | 5/1966 | Chelminski | 181—.5 |
| 3,256,952 | 6/1966 | Crider et al. | 181—.5 |
| 3,289,784 | 12/1966 | Cassand et al. | 181—.5 |
| 3,215,223 | 11/1965 | Kirby et al. | 181—.5 |

FOREIGN PATENTS 386,808   1/1933   Great Britain.

BENJAMIN A. BORCHELT, *Primary Examiner.*

SAMUEL FEINBERG, *Examiner.*

W. KUJAWA, *Assistant Examiner.*